C. R. BRADLEY.
SOIL PULVERIZING APPARATUS.
APPLICATION FILED JAN. 20, 1906.
980,484.
Patented Jan. 3, 1911.
2 SHEETS—SHEET 2.
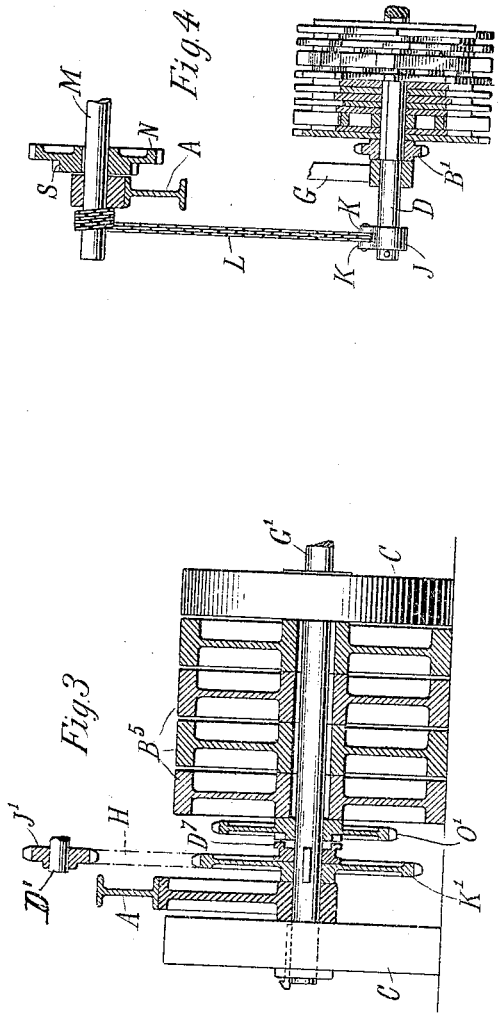
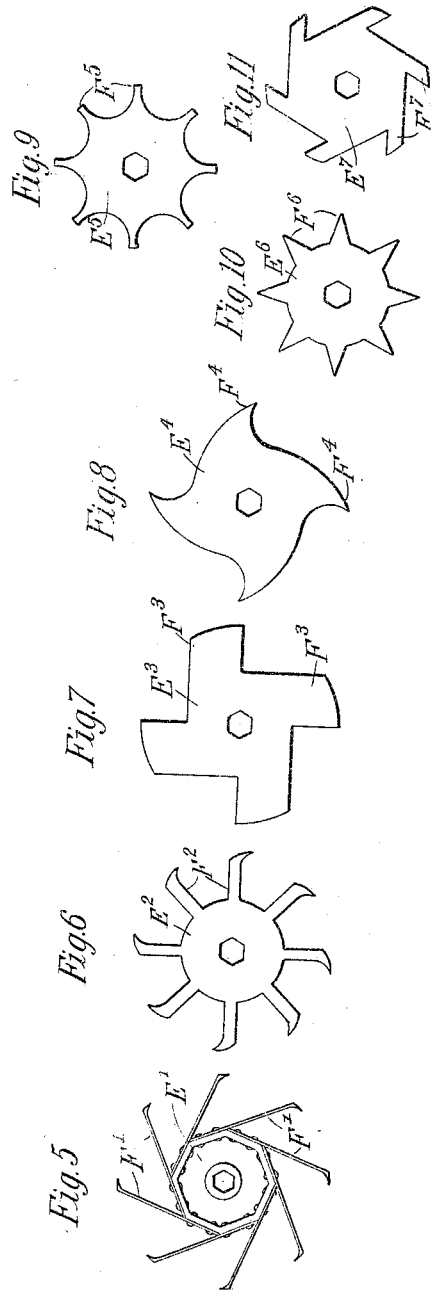

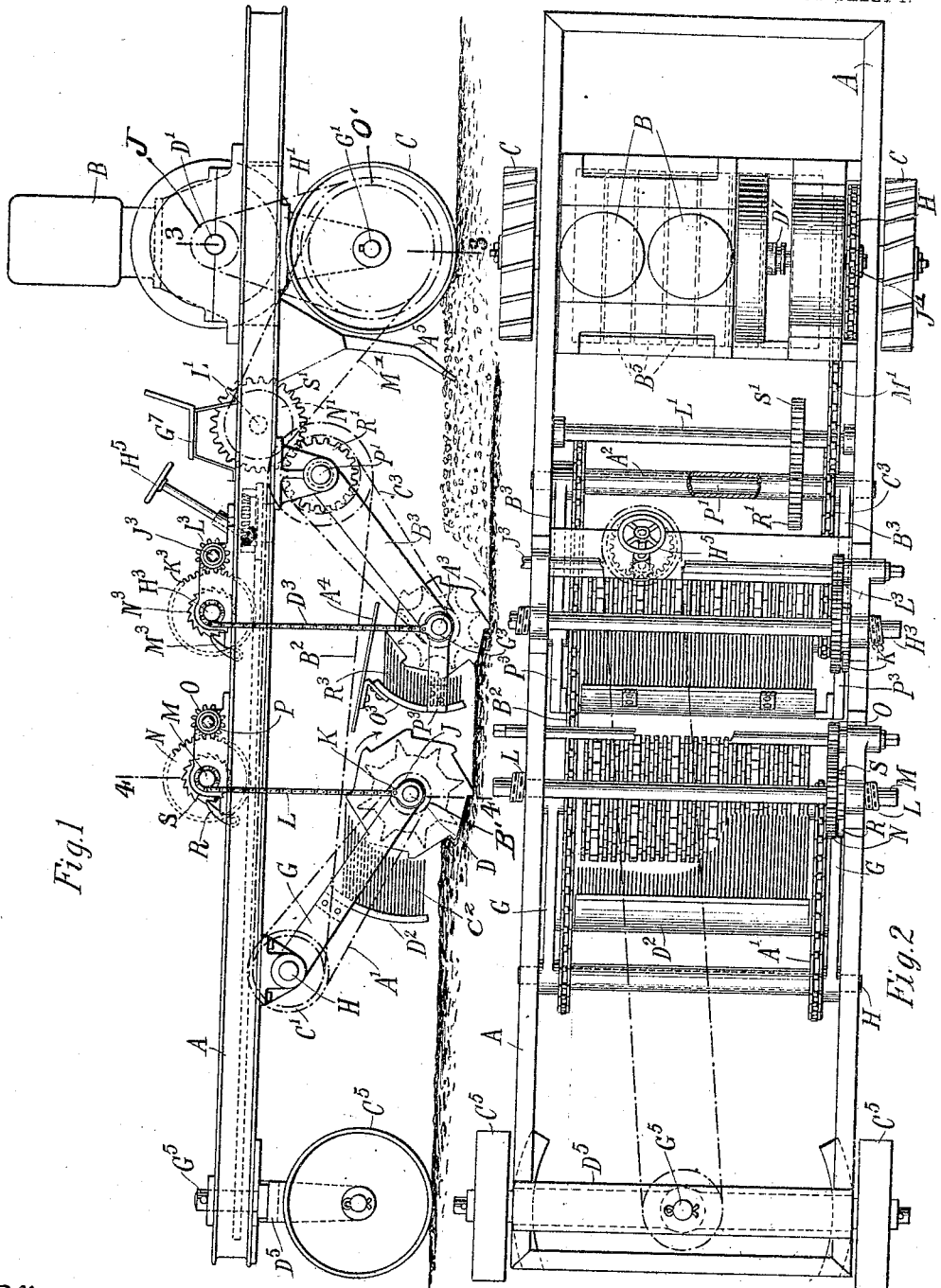

UNITED STATES PATENT OFFICE.

CHARLES R. BRADLEY, OF PARIS, FRANCE.

SOIL-PULVERIZING APPARATUS.

980,484.

Specification of Letters Patent. Patented Jan. 3, 1911.

Application filed January 20, 1906. Serial No. 296,941.

*To all whom it may concern:*

Be it known that I, CHARLES R. BRADLEY, a citizen of the United States, residing at Paris, France, have invented a new and useful Soil-Pulverizing Apparatus, of which the following is a specification.

This invention relates to soil pulverizing apparatus.

The object of the invention is to provide a machine which is simple in construction and efficient in operation for pulverizing the soil in the preparation of land for agricultural or other purposes.

A further object of the invention is to provide a machine of the character referred to which will efficiently pulverize the subsoil as well as the soil to any desired depth.

A further object of the invention is to provide a machine of the character referred to which combines soil pulverizing or disintegrating devices with seed sowing fertilizer distributing and soil compacting devices to produce a complete agricultural machine for preparing land and planting seeds therein.

Other objects of the invention will appear more fully hereinafter.

The invention consists substantially in the construction, combination, location and relative arrangement of parts all as will be more fully hereinafter set forth, as shown in the accompanying drawings and finally pointed out in the appended claims.

Referring to the accompanying drawings and to the various views and reference signs appearing thereon: Figure 1 is a view in side elevation of a construction of machine embodying the principles of my invention. Fig. 2 is a top plan view of the same, parts broken out to more clearly show the construction and arrangement of parts lying beneath. Fig. 3 is a broken view in section on the line 3, 3, Fig. 1. Fig. 4, a similar view on the line 4, 4, Fig. 1. Figs. 5, 6, 7, 8, 9, 10 and 11 are detail views, showing various forms of soil disintegrating or pulverizing plates employed in carrying out the principles of my invention.

The same part is designated by the same reference sign wherever it occurs throughout the several views.

In the use of plows or other similar devices employed in connection with the preparation of land for cultivation or other agricultural purposes, it frequently occurs that the soil is not sufficiently disintegrated or pulverized to secure the best results, and that the soil is not penetrated to a sufficient depth for the plants to be grown to derive the greatest benefit from the preparation or cultivation of the ground. It is among the special purposes of my present invention to provide a machine which overcomes these objections and by which the soil and the subsoil to any desired depth are efficiently disintegrated and thoroughly broken up and pulverized while both the surface soil and the sub-soil are returned to their relative positions without being mixed together to any appreciable extent. I also propose to combine with the soil disintegrating or pulverizing apparatus, suitable devices whereby the seeds to be planted are distributed to the pulverized or disintegrated soil the fertilizer evenly distributed and thereafter such soil compacted sufficiently to effect an efficient planting of the seeds by a single operation of the machine over the ground. It is to be understood that these various objects and purposes may be accomplished in a wide variety of ways. While, therefore, I have shown and will now describe the construction and operation of a machine embodying the principles of my invention, I do not desire to be limited or restricted to the exact or specific structure and arrangement.

In carrying out my invention I provide a suitable frame work A, and arrange the same to be supported on wheels and to be drawn, propelled or driven through the field or over the ground, the soil of which is to be pulverized or disintegrated. In the particular form shown, to which, however, my invention is not to be limited or restricted, a motor B is employed, and suitably mounted upon the frame work, and geared to the rear wheels C, thereby producing a traction machine.

The principal feature and characteristic of my invention resides in the construction and arrangement of the disintegrating or pulverizing devices. I have shown, as an illustrative operative embodiment of my invention in regard to this feature, but to which my invention is not to be limited or restricted, a shaft D, upon which are sleeved or otherwise mounted, a series of disks, plates or other devices, which may be of various peripheral shape or outline. In Figs. 5, 6, 7, 8, 9, 10 and 11 I have shown various forms of such devices, each constructed with peripheral teeth or projections of various kinds. These various plates are strung upon a shaft in such manner as to rotate with such shaft. As an operative embodiment of my idea and invention, the shaft D is of angular shape in cross section, preferably pentagonal or hexagonal, and each of the disintegrator plates is centrally perforated in corresponding contour. In practice I assemble these disintegrator plates in close compact relation with respect to each other upon the supporting shaft D, employing the various disintegrator plates in any desired and interspersed order throughout the length of the shaft D. Rotation at a high rate of speed may be imparted to the shaft D in any suitable or convenient manner. In the particular form shown, to which the invention, however, is not to be limited or restricted, not only are the disintegrator plates provided with various constructions, designs and styles of peripheral teeth and projections, but said plates may also be of varying diameter. Thus, in Fig. 5 is shown a disintegrator plate $E^1$, carrying projecting spring arms F, somewhat tangentially arranged and mounted upon, formed with, or suitably secured to, the periphery of the plate $E^1$. In Fig. 6 is shown a disintegrator plate $E^2$, having radiating arms or projections $F^2$. The spring arms $F^1$, and the radiating arms $F^2$, may, if desired, be hook shaped at their outer ends, as clearly shown. In Fig. 7 is shown a disintegrator plate $E^3$, having arms or projections $F^3$, arranged in the form of a cross. In Fig. 8 is shown a disintegrator plate $E^4$, having peripheral cutting projections or corners $F^4$. In Fig. 9 is shown a disintegrator plate $E^5$, having radial projections $F^5$, the depressions between adjacent projections being curved. In Fig. 10 is shown a disintegrator plate $E^6$, having radiating projections $F^6$; the plate and said projections being star shaped. In Fig. 11, I have shown a disintegrator plate $E^7$, having peripheral projections or teeth $F^7$, arranged somewhat similar to a circular saw. While I have shown various forms and shapes of disintegrator plates, it is obvious that many other specific forms of disintegrator plates may also be employed, and having various peripheral shapes or configurations, and of varying diameters. As above stated, in assembling the disintegrator plates upon their supporting shaft the various forms of plates may be arranged in any desired order, or may be indiscriminately interspersed in the relative rotative displacement. Disintegrator plates of varying thickness may also be employed, the thinner the plates the finer the disintegrated soil will be, and conversely, the thicker the plates used the coarser the disintegrated soil will be. The rotating disintegrator so constructed and assembled presents the appearance of a solid body of generally cylindrcial form and having a multitude of cutting or disintegrator peripheral edges, with a multitude of interspersed alternating pockets or recesses and arms, or projections. Of course, it is to be understood that the particular character of the soil to be disintegrated or pulverized will determine in a large measure the particular character of the disintegrator disks, and the relative arrangement in the assembling thereof. And only experience can determine the particular arrangement of the disintegrator disks for any particular character or quality of soil.

The disintegrator above described, or the supporting shaft D thereof may be supported upon the frame work in many specifically different ways, or in any suitable or convenient manner. As illustrative of an operative arrangement, I have shown the shaft D supported in the ends of arms G, said arms being pivotally mounted at their other ends upon a shaft H, suitably journaled or mounted in the frame work. By this construction the soil disintegrating device may be raised or lowered to regulate the depth of cut thereof by suitably rocking or swinging the arms G about the shaft H, upon which said arms are pivotally mounted. Any suitable arrangement of elevating or hoisting mechanism may be employed for adjustably raising and lowering the disintegrator. As illustrative of an operative embodiment, I have shown a collar J, loosely sleeved upon the shaft D, and having ears K, see Fig. 4, to which is secured the end of a chain, or other suitable connection L. This chain is arranged to be wound upon a shaft M, suitably journaled in the frame work, and adapted to be rotated in suitable or convenient manner, as for instance, by means of intermeshing gears N, O, the former being mounted on shaft M, and the latter upon a shaft P, to the end of which may be applied a crank arm. The pawl R, and the ratchet disk S, may serve to maintain the shaft M in any desired position of its rotative adjustment. The high rate of rotative speed may be imparted to the disintegrator, or to the supporting shaft D thereof, in any suitable or convenient manner. As illustrative of an operative embodiment for accomplishing this result, to which, however, my invention is in no manner to be limited or restricted, I have shown shaft D driven through a suitable drive chain indicated at $A^1$, operating over a gear $B^1$, upon shaft D and a gear $C^1$ on shaft H. The shaft H may be rotated from any convenient source of power, as for instance, from the motor through any suitable or convenient arrangement of driving gear. In the particular form shown, to which the invention however, is not limited or restricted, the motor shaft $D^1$, is geared to drive the axle or shaft $G^1$, upon which the traction wheels C are mounted, through a belt, sprocket or other driving connection $H^1$, operating over sprocket gears $J^1$, $K^1$, respectively mounted upon the shaft $D^1$, and axle $G^1$. From axle $G^1$ a shaft $L^1$, suitably journaled in the frame of the machine is driven through a sprocket chain or other suitable form of gearing indicated at $M^1$, operating over gears $N^1$, $O^1$, respectively mounted upon said shaft $L^1$ and axle or shaft $G^1$. The sleeve $A^2$ is mounted upon a shaft $P^1$, suitably journaled in the frame of the machine, said sleeve being driven through suitable intermeshing gears $R^1$, $S^1$, respectively mounted upon said sleeve $A^2$, and shaft $L^1$. The shaft H may be driven from sleeve $A^2$ in any convenient manner, as for instance, by means of a sprocket chain or other suitable driving connection $B^2$. It is obvious that any other form of driving gearing for imparting rotation to shaft D may be employed. I do not desire, therefore, to be limited or restricted to the gearing arrangement and driving mechanism shown and above described.

In practical operation the machine is advanced through a field or over ground, the soil of which is to be disintegrated, with the disintegrator adjusted to the proper height to effect a cut of the desired depth into the soil, and a high speed of rotary movement is imparted to said disintegrator. The cutting edges of the disintegrator plates revolving in the direction indicated by the arrow in Fig. 1, scoop up the soil by the engagement therewith of the radiating or projecting arms or bits of the individual disintegrator plates, in small increments. The speed of progression of the machine is to be so regulated relatively to the speed of rotation of the disintegrator as to enable such cutting point arm or projection of the disintegrator plates to effect a gouging and scooping action upon a comparatively small fraction of the soil. The soil or dirt thus scooped up is thrown upwardly by the centrifugal force resulting from the rapid rotation imparted to the disintegrator. Ordinarily the soil thus scooped up and thrown by the centrifugal action of the disintegrator would be thrown not only upwardly, but somewhat forwardly, or in advance of the disintegrator, and would not be sufficiently disintegrated or pulverized. To avoid these objections I propose to employ a series of spring fingers $C^2$, suitably supported upon a hood $D^2$, carried upon the arms G, or other suitable or convenient part of the frame which supports the disintegrator. These spring arms are preferably of stiff spring material, and their free ends extend from the hood or shield $D^2$ toward and in close proximity to the peripheral surface of the disintegrator plates, and they serve in conjunction with the hood or shield $D^2$, not only to prevent the soil detached from the ground by the disintegrator from being thrown upwardly from the disintegrator, but also to compel such dirt or soil to be carried around with the cylinder until the free ends of the spring arms or fingers are passed, when such soil will be thrown off centrifugally, but upwardly and rearwardly from the disintegrator, while at the same time such soil is thoroughly disintegrated and pulverized by being forced through and between the spring arms or fingers $C^2$, so that when such soil is finally thrown from the disintegrator, it is thoroughly disintegrated and pulverized. The spring fingers, or arms $C^2$, not only perform the function therefore, of compelling the soil scooped up by the disintegrator to be thrown upwardly and rearwardly by the disintegrator, but also serve to pulverize and thoroughly disintegrate the soil, at the same time yielding sufficiently to enable any undue obstruction in the form of stone, stick, or the like to pass through without injury to the apparatus. As the machine progresses through the field the soil thus dug up and disintegrated is delivered in a flying stream upon the surface of the ground to the rear of the disintegrator, and over which the cylinder has passed.

If one built up disintegrator is insufficient to effect a cut of the desired depth or if it is desired to separately pulverize the sub-soil and return it to its relative position unmixed with the surface soil, one or more additional disintegrators may also be mounted upon the machine, and of suitable size and diameter, to follow up the advance disintegrator to effect a still deeper cut into the ground and in this manner separately pulverize the sub-soil. The additional disintegrator, may be of identically the same structure, arrangement and relation of parts as that above described, and capable of being driven at the same peripheral speed and of the same vertical adjustment, to regulate or vary the depth of cut made thereby. I have shown one additional disintegrator mounted upon a shaft $A^3$, suitably supported in arms $B^3$, the latter being sleeved to rock upon shaft $P^1$. The shaft $A^3$ may be driven from shaft $P^1$ in any convenient manner, as for instance, by a drive belt or chain $C^3$, or other convenient drive mechanism. The disintegrator shaft $A^3$ may be vertically adjusted by an adjusting chain $D^3$, suitably connected to a collar $G^3$, mounted upon shaft $A^3$, and coiled upon a shaft $H^3$, driven from a crank shaft $J^3$, through intermeshing gears $K^3$, $L^3$, and having associated therewith a stop pawl $M^3$, and ratchet $N^3$, similar in all respects to corresponding features above described with reference to the advance disintegrator. In similar manner the rear disintegrator may have associated therewith a hood or shield O³, suitably supported upon arms P³, forming projections or extensions of the arms B³, associated spring arms or fingers R³, performing the same functions with respect to the disintegrator carried by shaft A³, as the spring fingers C², with respect to the disintegrator carried by shaft D, and as above explained. If desired, or required, and in order to prevent the disintegrated and pulverized soil from the front disintegrator from falling upon the disintegrator carried by shaft A³, a shield or guard plate A⁴, may be suitably supported above the hood O³ and in position to protect the rear disintegrator from the disintegrated dirt or soil of the front disintegrator, thereby effectually preventing the surface soil pulverized by the front disintegrator from being mixed with the sub-soil pulverized by the rear disintegrator. The disintegrated soil scooped up and pulverized by the rear disintegrator, is delivered from such disintegrator in a stream upon the ground to the rear of said rearmost disintegrator, and over which said disintegrator has progressed. The action of the apparatus is clearly indicated in Fig. 1, the forward disintegrator being shown as effecting a certain depth of cut into the surface of the ground or field over which the machine operates, while the rearmost disintegrator is removing a somewhat deeper cut in the path of the forward disintegrator, the disintegrated and pulverized soil from both disintegrators being shown in loosened condition, as delivered from the disintegrating devices, and over the loosened bed of soil thus disintegrated and pulverized, and deposited, the traction wheels C operate.

In practice, and in order to utilize the machine as a seeder, and fertilizer distributer as well as a soil disintegrator and pulverizer, suitable seeding or distributing devices A⁵, may be suitably arranged upon the frame of the machine, to deliver the seed or fertilizer into the disintegrated and pulverized soil at a convenient point to the rear of the disintegrating devices, and in order to suitably compact the surface of the disintegrated soil over and upon the seed and fertilizer thus delivered into the disintegrated soil, I propose to mount upon the axle G¹, a series of loosely mounted rollers B⁵, the diameters of the bores of said rollers being somewhat larger than the diameter of the axle G¹, upon which they are mounted, so as to afford a desirable flexibility to prevent binding of said rollers in the operation of the machine. The operation of these rollers over the surface of the disintegrated and pulverized soil, and at a point to the rear of the seeding and fertilizer distributing devices A⁵, serves to compact the surface of the disintegrated soil sufficiently to cover the seeds and fertilizer delivered from the seeding and fertilizer distributing devices.

The machine may be guided and controlled in its direction of movement and in turning in any suitable or convenient manner. I have shown a simple arrangement, to which, however, my invention is not to be limited or restricted, wherein the front wheels C⁵, are mounted upon an axle and carried in a yoke D⁵, which is swiveled, as at G⁵, in the frame work, and which may be rocked in any convenient manner, as for instance, from a steering wheel H⁵, in convenient location with reference to the seat of the machine attendant or driver.

It frequently happens that stones, sticks or the like are encountered as the machine progresses or advances through a field. Indeed, it may be sometimes desirable to operate the machine over stony ground merely for the purpose of removing the stones. The form of disintegrator plate shown at E¹ in Fig. 5, having the spring arms F¹, is well adapted for the purpose of removing any undue obstruction in the form of stones or sticks, and where the ground is unusually stony a greater or less number of the disintegrator plates may be of the form shown in this figure of the drawings, or, if necessary, the entire disintegrator may be made up of plates of this form. Similarly, and for other purposes, a greater or less number of other specifically different shapes of disintegrator plates may be employed, the character of the ground and the condition of the soil determining the matter. It is obvious that a machine embodying the principles of my invention may also be employed for cultivating purposes after a crop is sown. In such case the soil compressing rollers D⁵ are removed and the disintegrators are operated between adjacent rows of the standing crop, and by suitably regulating the depth of the cut effected by the disintegrators the desired cultivation may be effected without danger of injury to the growing plants or other roots. It is obvious that many other uses of the machine would readily suggest themselves to the farmer without in any manner departing from the spirit and scope of my invention. I do not desire, therefore, to be limited or restricted in respect of the use to which my invention is to be put.

I have indicated a clutch D⁷ for coupling or uncoupling gear O¹ with respect to axle G¹, whereby the driving gearing for the pulverizing or disintegrating devices may be thrown out of action whenever desired, as for instance, during the transportation of the machine from one point to another, or to and from the place where the machine is to be used, and without arresting the propelling motor.

A driver's seat is indicated at G⁷.

In practice I propose to so proportion the driving gearing as that both the forward and the rear disintegrating devices shall revolve at the same peripheral speed. This, however, is a detail that is not of vital importance.

From the foregoing description it will be seen that I provide an exceedingly simple compact and efficient apparatus with few parts to become deranged or put out of order, and wherein the operating parts are strong and durable, and capable of withstanding the rough usages to which agricultural implements and machines are subjected, even in the hands of unskilled farm labor, and it is believed that the construction and operation of the machine will be readily and fully understood from the foregoing description taken in connection with the accompanying drawings. It is to be understood, however, that my invention does not specially concern itself with the form, construction or arrangement of the supporting frame work or of the driving gear, or of the height adjusting mechanisms, and these unessential details may be varied and modified throughout a wide range.

Having now set forth the object and nature of my invention and a construction embodying the principles thereof, what I claim as new and useful, and of my own invention and desire to secure by Letters Patent, is:—

1. In a soil pulverizing apparatus, a series of disintegrating plates assembled into a compact body, said plates having peripheral cutting edges of varying conformation, and a plurality of spring fingers arranged to extend into proximity with the periphery of said body, and means for rotating said body.

2. In a soil pulverizing apparatus, a series of disintegrating plates assembled into a compact body, said plates having peripheral cutting edges of varying comformation, and means for rotating said body, in combination with the hood or shield arranged in advance of said body, and a plurality of spring fingers carried by said hood or shield, and having their free ends extending toward and into proximity with the periphery of said body.

3. In a soil pulverizing apparatus, a disintegrator having a peripheral cutting surface of varying conformation and means for rotating the same at a high speed, in combination with a plurality of spring fingers projecting into proximity with the peripheral surface of said disintegrator.

4. In a soil pulverizing apparatus, a disintegrator having a peripheral cutting surface of varying conformation, means for rotating the same at a high rate of speed, and spring fingers having their free ends extending into proximity to the peripheral surface of said disintegrator.

5. In a soil pulverizing apparatus, a disintegrator having a peripheral cutting surface of varying conformation, means for rotating said disintegrator at a high rate of speed, a hood arranged in advance of said disintegrator and carrying spring arms, the free ends of said arms extending into close proximity with the peripheral surface of said disintegrator.

6. In a soil pulverizing apparatus, a vehicle adapted to be progressed over the surface of the ground to be disintegrated, disintegrators supported by said vehicle, each of said disintegrators having a peripheral cutting surface of varying conformation, the one arranged behind the other to operate at a greater depth, means for rotating said disintegrators at high rates of peripheral speed, and a deflector plate arranged to protect the rearmost disintegrator from the material disintegrated by the forward disintegrator.

7. In a soil pulverizing apparatus, a vehicle adapted to be moved along the ground to be disintegrated, disintegrators supported by said vehicle and arranged the one behind the other to operate to effect a cut of greater depth, said disintegrators having peripheral cutting surfaces of varying conformation, a set of spring fingers for each cylinder, said spring fingers having their free ends arranged to extend into proximity with the peripheral surface of said disintegrators, and means for rotating said disintegrators at high rates of speed.

8. In a soil pulverizing apparatus, a vehicle adapted to be moved over the surface of the ground to be disintegrated, disintegrators supported by said vehicle, one in advance of the other and each having a peripheral cutting surface of varying conformation, means for rotating said disintegrators at high rates of peripheral speed, and a deflecting hood arranged in advance of each disintegrator to deflect the soil delivered therefrom rearwardly and over said disintegrators.

9. In a soil pulverizing apparatus, a vehicle adapted to be progressed along the surface of the ground to be disintegrated, disintegrators supported by said vehicle and arranged the one behind the other to operate at a greater depth below the surface of the ground, said disintegrators having peripheral cutting surfaces of varying conformation, a hood arranged in advance of each disintegrator to deflect the soil delivered therefrom upwardly and rearwardly over said disintegrators, and a series of spring fingers supported by each hood and having their free ends extending into close proximity with the peripheral surface of their associated disintegrator, and means for rotating said disintegrators at high rates of speed.

10. In an apparatus of the class described, the combination of rotary surface soil disintegrating devices and rotary sub-soil disintegrating devices, the rotation of said surface soil disintegrating devices operating to deliver the disintegrated surface soil upon the disintegrated sub-soil.

11. In an apparatus of the class described, a surface soil pulverizing device, a sub-soil pulverizing device, and means for delivering the pulverized surface soil over the sub-soil pulverizing device whereby the pulverized surface soil is returned to its relative position on top of the pulverized sub-soil.

12. In an apparatus of the class described, a vehicle, adapted to be progressed over the ground, surface soil pulverizing devices mounted on said vehicle, sub-soil pulverizing devices also mounted on said vehicle to the rear of the surface soil pulverizing devices, distributing devices mounted on the vehicle to the rear of the sub-soil pulverizing devices, and soil compacting devices mounted on the vehicle to the rear of the distributing devices, all combined and arranged as and for the purpose set forth.

13. In a soil pulverizing apparatus, a disintegrator having a peripheral cutting surface, of varying configuration and a means for rotating said disintegrator at a high speed, in combination with a plurality of spring fingers projecting into proximity with the peripheral surface of said disintegrator.

14. In a soil pulverizing apparatus, a disintegrator having a peripheral cutting surface, of varying configuration and means for rotating the same at a high speed, in combination with a hood arranged in advance of said disintegrator, and carrying spring fingers having their ends arranged to extend into proximity with the peripheral surface of the said disintegrator.

15. In a soil pulverizing apparatus, a series of disintegrating plates assembled into a compact body, said plates having peripheral cutting edges, of varying configuration, a plurality of spring fingers arranged to extend into proximity with the periphery of the said body, and means for rotating said body.

16. In a soil pulverizing apparatus, a series of disintegrating plates assembled into a compact body, said plates having peripheral cutting edges, of varying configuration, a hood arranged in advance of said body, and carrying spring fingers having their ends arranged to extend into proximity with the periphery of said body, and means for rotating said body.

17. In a soil pulverizing apparatus, a frame adapted to be progressed along the ground, a disintegrator carried thereby, and having a peripheral cutting surface, of varying configuration, means for rotating said disintegrator at a high speed and in a direction for the cutting surface thereof to operate in the direction of progression of the frame along the ground, and spring fingers arranged in advance of said disintegrator and having their ends extending into proximity with the peripheral surface thereof.

In witness whereof, I have hereunto set my hand this 15th day of January 1906, in the presence of the subscribing witnesses.

CHARLES R. BRADLEY.

Witnesses:
EDWARD H. MILLER,
S. E. DARBY.